United States Patent Office 3,773,782
Patented Nov. 20, 1973

3,773,782
THIOPHOSPHATES OF ACYLATED 3-AMINO-
2-OXAZOLIDONES
James Zielinski, 7 Tripplet Road,
Somerset, N.J. 08873
No Drawing. Continuation-in-part of abandoned application Ser. No. 33,860, May 1, 1970. This application Oct. 18, 1971, Ser. No. 190,297
Int. Cl. C07d 85/28
U.S. Cl. 260—307 C   12 Claims

ABSTRACT OF THE DISCLOSURE

Thiophosphates of acylated 3 - amino-2-oxazolidones represented by the following structure:

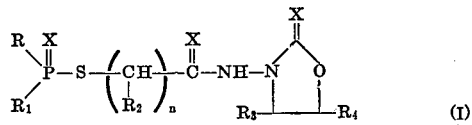
(I)

In this formula, each of R and $R_1$ is $C_1$–$C_6$ alkylthio, $C_1$–$C_6$ alkyl optionally substituted by halogen, nitro, alkoxy, alkylthio, phenyl and phenoxy. Each of R and $R_1$ may also be phenyl and phenoxy optionally substituted by halogen, nitro, and $C_1$–$C_6$ alkyl. Each of $R_2$ and $R_3$ is hydrogen, lower alkyl ($C_1$–$C_6$ branched or unbranched), $C_1$–$C_6$ alkylthioalkyl, $C_1$–$C_6$ alkoxyalkyl, $C_1$–$C_6$ mono or dialkylaminoalkyl, $C_1$–$C_6$ alkylthio, alkoxy or mono and dialkylamino, $C_1$–$C_6$ alkyl sulfoxyl or $C_1$–$C_6$ alkyl sulfonyl, CN, halogen, carboxamido and carboalkoxy. $R_4$ is hydrogen, $C_1$–$C_6$ alkyl, $C_1$–$C_6$ haloalkyl, $C_1$–$C_6$ alkylthioalkyl, $C_1$–$C_6$ alkoxy-alkyl, or $C_1$ to $C_8$ mono and $C_2$ to $C_8$ dialkylamino alkyl. Each X is oxygen or sulfur. The symbol $n$ stands for an integer of from 1 to 3.

Preferred are those compounds in which each of R and $R_1$ is $C_1$–$C_3$ alkoxy; each of $R_2$, $R_3$ and $R_4$ is hydrogen; each X is oxygen; and $n$ is 1. These organo phosphorus compounds have been found to possess highly active contact and systemic insecticidal and miticidal activity.

CROSS-REFERENCE TO RELATED APPLICATION

This is a continuation-in-part of application Ser. No. 33,860, filed May 1, 1970, now abandoned.

DETAILED DISCLOSURE

This invention relates to a new group of dialkyl thio and dithio-phosphoro- and phosphono- and phosphino-acetyl-3-amino-2-oxazolidones and to their use as pesticides.

The novel pesticides of this invention correspond to the following general Formula I.

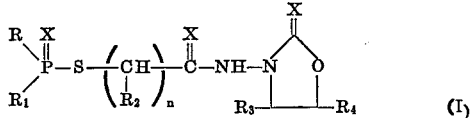
(I)

In this formula, each of R and $R_1$ is $C_1$–$C_6$ alkylthio, $C_1$–$C_6$ alkyl optionally substituted by halogen, nitro, alkoxy, alkylthio, phenyl and phenoxy. Each of R and $R_1$ may also be phenyl and phenoxy optionally substituted by halogen, nitro, and $C_1$–$C_6$ alkyl. Each of $R_2$ and $R_3$ is hydrogen, lower alkyl ($C_1$–$C_6$ branched or unbranched), $C_1$–$C_6$ alkylthioalkyl, $C_1$–$C_6$ alkoxyalkyl, $C_1$–$C_6$ mono or dialkylaminoalkyl, $C_1$–$C_6$ alkylthio, alkoxyl or mono and dialkylamino, $C_1$–$C_6$ alkyl sulfoxyl or $C_1$–$C_6$ alkyl sulfonyl, CN, halogen, carboxamido and carboalkoxy. $R_4$ is hydrogen, $C_1$–$C_6$ alkyl, $C_1$–$C_6$ haloalkyl, $C_1$–$C_6$ alkylthioalkyl, $C_1$–$C_6$ alkoxyl-alkyl, or $C_1$ to $C_8$ mono and $C_2$ to $C_8$ dialkylamino alkyl. Each X is oxygen or sulfur. The symbol $n$ stands for an integer of from 1 to 3. Each X is oxygen or sulfur. These organo phosphorus compounds have been found to possess highly active contact and systemic insecticidal and miticidal activity.

Of particular interest are those compounds of Formula I in which each of R and $R_1$ is $C_1$–$C_3$ alkyl, $C_1$–$C_3$ alkoxy or $C_1$–$C_3$ alkylthio; $R_2$ is hydrogen, methyl, methoxy or methylthio; each of $R_3$ and $R_4$ is hydrogen, alkyl, alkoxyalkyl or alkylthio-alkyl having a total of from 1–3 carbon atoms; each X is oxygen or sulfur; and $n$ stands for the integer 1 or 2.

Especially useful as insecticides and miticides are those compounds encompassed by Formula II.

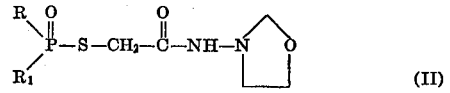
(II)

in which each of R and $R_1$ represents $C_1$–$C_3$ alkoxy.

Examples of compounds included within Formula I are:

| Compound number | | |
|---|---|---|
| 1 | O,O-dimethyl-S-[N-3(5-methyl)-oxazolid-2-onyl]carbamoyl methyl phosphorothioate. | 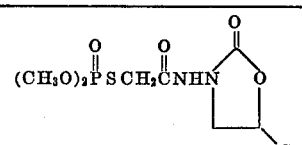 |
| 2 | O,O-dimethyl-S-[N-3(5-methoxymethyl) oxazolid-2-onyl]-carbamoyl methyl phosphorothioate. | 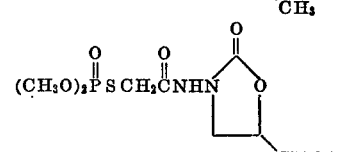 |
| 3 | O,O-dimethyl-S-[N-3(oxazolid-2-onyl)]carbamoyl methyl phosphorodithioate. | 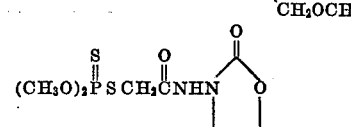 |
| 4 | O,O-dimethyl-S-[N-3(5-ethylthiomethyl) oxazolid-2-onyl]-carbomyl methyl phosphorothioate. | 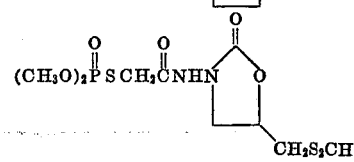 |

TABLE—Continued

| Compound number | | |
|---|---|---|
| 5 | O,O-dimethyl-S-[N-3(oxazolid-2-onyl)] carbamoyl methyl phosphorothioate. | 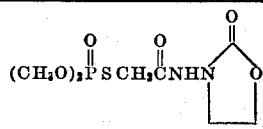 |
| 6 | O-ethyl-S-n-propyl-S-[N-3-(oxazolid-2-onyl)] carbamoyl methyl phosphorodithioate. | 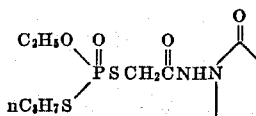 |
| 7 | O,O-diethyl-S-[N-3(oxazolid-2-onyl)]carbamoyl methyl phosphorothioate. | 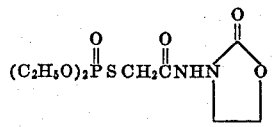 |
| 8 | Ethyl-O-ethyl-S[N-3(5-methyl)-oxazolid-2-onyl] carbamoyl methyl phosphorothioate. | 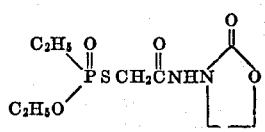 |
| 9 | O,O-diethyl-S[N-3(4-methyl)oxazolid-2-onyl] carbamoyl methylthiomethyl phosphorodithioate. | 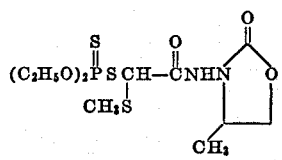 |
| 10 | O,O-diethyl-S[N-3(5-ethyl)-oxazolid-2-onyl] thiocarbamyl methyl phosphorothioate. | 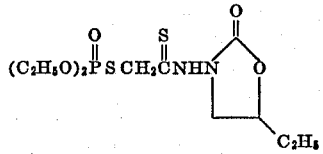 |
| 11 | O,O-dimethyl-S[N-3(oxazolid-2-onyl)]carbamoyl methoxymethyl phosphorothioate. | 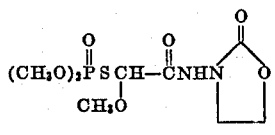 |
| 12 | O,O-diethyl-S[N-3(4-ethyl)-oxazolid-2-onyl) 2-carbamoyl-2-ethyl phosphorothioate. | 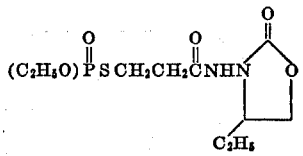 |
| 13 | O,O-dimethyl-S[N-3(oxazolid-2-thionyl)]carbamoyl methyl phosphorodithioate. | 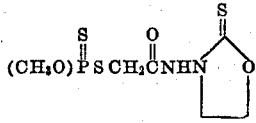 |
| 14 | O,O-diethyl-S[N-3(oxazolid-2-onyl)]carbamoyl methyl phosphorodithioate. | 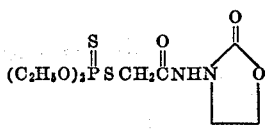 |
| 15 | O,O-dimethyl-S[N-3(oxazolid-2-onyl)]carbamoyl-1-ethyl phosphorothioate. | 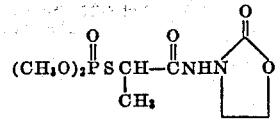 |

The foregoing compounds can be readily prepared by the following synthetic methods. For example, the preferred method for preparation of these compounds in which each X is oxygen, $R_2$ is H and $n$ is 1 comprises:

Step 1

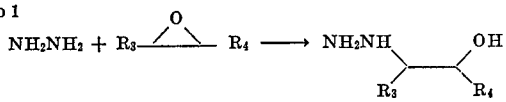

General preparation described in U.S. Pat. 2,660,607, Eaton Labs. (1953), by G. Gever and C. J. O'Keefe. Also: I. L. Finar and K. Utting, J. Chem. Soc. 5272 (1960); G. Gever, J. Am. Chem. Soc. 76, 1284 (1954); Gabriel, Ber. 47, 3032 (1914); and C. Gansser and P. Rumpf, Helv. Chim. Acta 36, 1423 (1953).

Step 2

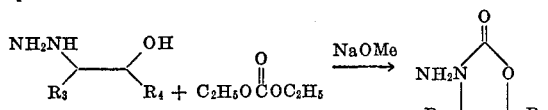

General preparation described in U.S. Pat. 2,652,402; Eaton Labs. (1953), by G. Gever.

Step 3

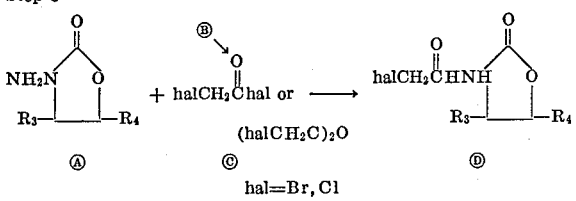

hal=Br, Cl

When B is used, a trialkylamine (alk$_3$N) is employed to neutralize the HCl.

Step 4

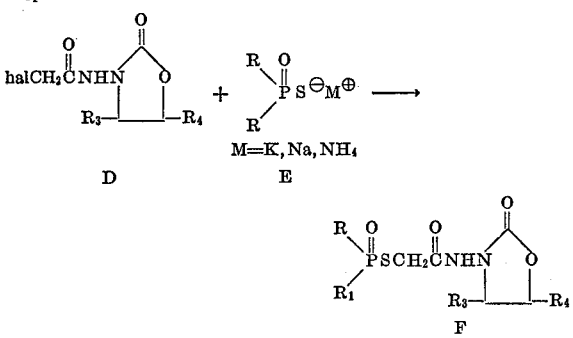

GENERAL REACTION CONDITIONS

Step 3

| Mole ratio | | | | | Reaction time, hours |
| --- | --- | --- | --- | --- | --- |
| A | B | alk₃N | Temperature | Solvent | |
| 1 | 1.1 | 1.5-3 | −20° to 150° | Ether, benzene, acetonitrile. | 1-24 |
| A | C | | | | |
| 1 | 1-2 | | −29° to 150° | Benzene, ether, acetonitrile. | 1-24 |

Step 4

| D | E | | | | |
| --- | --- | --- | --- | --- | --- |
| 1 | 1 | 1-3.0 | 0 to 150° | Benzene, toluene, xylene, acetonitrile. | 1-72 |

Compounds in which some or all of the X's are sulfur, R is other than hydrogen and $n$ is 2 or 3 can be prepared using analogous methods with appropriate starting materials.

The compounds of the invention have general insecticidal properties. Insecticidal compositions of the invention are prepared by admixing one or more of the active ingredients defined heretofore, in insecticidally effective amounts with a conditioning agent of the kind used and referred to in the art as a pest control adjuvant or modifier to provide formulations adapted for ready and efficient application to the soil using conventional applicator equipment.

Thus, the insecticidal compositions or formulations are prepared in the form of solids or liquids. Solid compositions are preferably in the form of granulars or dusts.

The compositions can be compounded to give homogeneous free flowing dusts by admixing the active compound or compounds with finely divided solids preferably talc, natural clays, pyrophyllite, diatomaceous earth, or flours such as walnut shell, wheat, redwood, soya bean, and cotton-seed flours. Other inert solid conditioning agents or carriers of the kind conventionally employed in preparing pest control compositions in powdered form can be used.

Granulars can be compounded by absorbing the compound in liquid form onto a preformed granular diluent. Such diluents as natural clays, pyrophyllite, diatomaceous earth, flours such as walnut shell, as well as granular sand can be employed.

In addition, granulars can also be compounded by admixing the active ingredient with one of the powdered diluents described hereinabove, followed by the step of either pelleting or extruding the mixture.

Liquid compositions of the invention are prepared in the usual way by admixing one or more of the active ingredients with a suitable liquid diluent medium. In the cases where the compounds are liquids, they may be sprayed in ultra low volume as such. With certain solvents, such as alkylated naphthalene or other aromatic petroleum solvents, dimethyl formamide, cycloketone, relatively high (up to about 50% by weight or more) concentration of the active ingredient can be obtained in solution.

The insecticidal compositions of the invention whether in the form of dusts or liquids, preferably also include a surface-active agent sometimes referred to in the art as a wetting, dispersing, or emulsifying agent. These agents, which will be referred to hereinafter more simply as surface-acting dispersing agents, cause the compositions to be easily dispersed in water to give aqueous sprays which, for the most part, constitute a desirable composition for application.

The surface-active dispersing agents employed can be of the anionic, cationic, or nonionic type and include, for example, sodium and potassium oleate, the amine salts of oleic acid, such as morpholine and dimethylamine oleates, the sulfonated animal and vegetable oils, such as sulfonated fish and castor oils, sulfonated petroleum oils, sulfonated acyclic hydrocarbons, sodium salt of lignin sulfonic acid (goulac), alkylnaphthalene sodium sulfonate, sodium salts of sulfonated condensation products of naphthalene and formaldehyde, sodium lauryl sulfate, disodium monolauryl phosphate, sorbitol laurate, pentaerythritol monostearate, glycerol monostearate, diglycol oleate, polyethylene oxides, ethylene oxide condensation products with stearyl alcohol and alkylphenol, polyvinyl alcohols, salts, such as the acetate of polyamines from reductive amination of ethylene/carbon monoxide polymers, laurylamine hydrochloride, lauryl-pyridinium bromide, stearyl trimethylammonium bromide, cetyldimethylbenzyl ammonium chloride, lauryldimethylamine oxide, and the like. Generally, the surface-active agent will not comprise more than about 5 to 15% by weight of the composition, and in certain compositions the percentage will be 1% or less. Usually, the minimum lower concentration will be 0.1%.

The insecticidal compositions are applied either as a spray, granular or a dust to the locus or area to be protected from undesirable insects. Such application can be made directly upon the locus or area and the insects thereon during the period of insect infestation in order to destroy the insects, but preferably, the application is made in advance of an anticipated insect infestation to prevent such infestation. Thus, the compositions can be applied as aqueous foliar sprays but can also be applied as sprays directly to the surface of the soil. Alternatively, the dry powdered compositions can be dusted directly on the plants or on the soil.

The active compound is, of course, applied in an amount sufficient to exert the desired insecticidal action. The amount of the active compound present in the compositions as actually applied for destroying or preventing infestation by the insects will vary with the manner of application, the particular insect for which control is sought, the purpose for which the application is being made, and like variables. In general, the insecticidal compositions as applied in the form of a spray, dust or granular, will contain from about 0.1% to 100% by weight of the active compound.

The term "carrier" or "diluent" as used herein means a material, which can be inorganic or organic and synthetic or of natural origin, with which the active ingredient is mixed or formulated to facilitate its storage, transport, and handling and application to the plants to be treated. The carrier is preferably biologically and chemically inert and, as used, can be a solid or fluid. When solid carriers are used, they are preferably particulate, granular, or pelleted; however, other shapes and sizes of solid carrier can be employed as well. Such preferable solid carriers can be natural occurring minerals—although subsequently subjected to grinding, sieving, purification, and/or other treatments—including, for example, gypsum; tripolite; diatomaceous earth; mineral silicates such as mica, vermiculite, talc, and pyrophyllite; clays of the montmorillonite, kaolinite, or attapulgite groups; calcium or magnesium limes, or calcite and dolomite; etc. Carriers produced synthetically, as for example, synthetic hydrated silica oxides and synthetic calcium silicates can also be used, and many proprietary products of this type are available commercially. The carrier can also be an elemental substance such as sulfur or carbon, preferably an activated carbon. If the carrier possesses intrinsic catalytic activity such that it would decompose the active ingredient, it is advantageous to incorporate a stabilizing agent, as for example, polyglycols such as diethylene glycol, to neutralize this activity and thereby prevent possible decomposition of the derivatives of the present nitrated aryl compounds.

For some purposes, a resinous or waxy carrier can be used, preferably one which is solvent soluble or thermoplastic, including fusible. Examples of such carriers are natural or synthetic resins such as a coumarone resin, rosin, copal, shellac, dammar, polyvinyl chloride, styrene polymers and copolymers, a solid grade of polychlorophenol such as is available under the registered trademark "Aroclor," a bitumen, an asphaltite, a wax for example, beeswax or a mineral wax such as paraffin wax or montan wax, or a chlorinated mineral wax, or a microcrystalline wax such as those available under the registered trademark "Mikrovan Wax." Compositions comprising such resinous or waxy carriers are preferably in granular or pelleted form.

Fluid carriers can be liquids, as for example, water, or an organic fluid, including a liquefied normally vaporous or gaseous material, or a vaporous or gaseous material, and can be solvents or nonsolvents for the active material. For example, the horticultural petroleum spray oils boiling in the range of from about 275° to about 575° F., or boiling in the range of about 575° to about 1,000° F. and having an unsulfonatable residue of at least about 75% and preferably of at least about 90%, or mixtures of these two types of oil, are particularly suitable liquid carriers.

The carrier can be mixed or formulated with the active material during its manufacture or at any stage subsequently. The carrier can be mixed or formulated with the active material in any proportion depending on the nature of the carrier. One or more carriers, moreover, can be used in combination.

The compositions of this invention can be concentrates, suitable for storage or transport and containing, for example, from about 5 to about 90% by weight of the active ingredient, preferably from about 20 to about 80 wt. percent. These concentrates can be diluted with the same or different carrier to a concentration suitable for application. The compositions of this invention may also be dilute compositions suitable for application. In general, concentrations of about 0.1 to about 10% by weight, of active material based on the total weight of the compositions are satisfactory, although lower and higher concentrations can be applied if necessary.

The compositions of this invention can also be formulated as dusts. These comprise an intimate admixture of the active ingredient and a finely powdered solid carrier such as aforedescribed. The powdered carriers can be oil-treated to improve adhesion to the surface to which they are applied. These dusts can be concentrates, in which case a highly sorptive carrier is preferably used. These require dilution with the same or a different finely powdered carrier, which can be of lower sorptive capacity, to a concentration suitable for application.

The compositions of the invention can be formulated as wettable powders comprising a major proportion of the active ingredient mixed with a dispersing, i.e., deflocculating or suspending agent, and if desired, a finely divided solid carrier and/or a wetting agent. The active ingredient can be in particulate form or adsorbed on the carrier and preferably constitutes at least about 10%, more preferably at least about 25% by weight of the composition. The concentration of the dispersing agent should in general be between about 0.5 and about 5% by weight of the total composition, although larger or smaller amounts can be used if desired.

The dispersing agent used in the composition of this invention can be any substance having definite dispersing, i.e., deflocculating or suspending, properties as distinct from wetting properties, although these substances can also possess wetting properties as well.

The dispersant or dispersing agent used can be protective colloids such as gelatin, glue, casein, gums, or a synthetic polymeric material such as polyvinyl alcohol and methyl cellulose. Preferably, however, the dispersants or dispersing agents used are sodium or calcium salts or high molecular weight sulfonic acids, as for example, the sodium or calcium salts of lignin sulfonic acids derived from sulfite cellulose waste liquors. The calcium or sodium salts of condensed aryl sulfonic acid, for example, the products known as "Tamol 731," are also suitable.

The wetting agents used can be nonionic type surfactants, as for example, the condensation products of fatty acids containing at least 12, preferably 16 to 20, carbon atoms in the molecule, or abietic acid or naphthenic acid obtained in the refining of petroleum lubricating oil fractions with alkylene oxides such as ethylene oxide or propylene oxide, or with both ethylene oxide and propylene oxide, as for example, the condensation product of oleic acid and ethylene oxide containing about 6 to 15 ethylene oxide units in the molecule. Other nonionic wetting agents like polyalkylene oxide polymers, commercially known as "Pluronics" can be used. Partial esters of the above acids with polyhydric alcohols such as glycerol, polyglycerol, sorbitol, or mannitol can also be used.

Suitable anionic wetting agents include the alkali metal salts, preferably sodium salts, or sulfuric acid esters or sulfonic acids containing at least 10 carbon atoms in a molecule, for example, the sodium secondary alkyl sulfates, dialkyl sodium sulfosuccinate available under the registered trademark "Teepol," sodium salts of sulfonated castor oil, sodium dodecyl benzene sulfonate.

Granulated or pelleted compositions comprising a suitable carrier having the active ingredient incorporated therein are also included in this invention. These can be prepared by impregnating a granular carrier with a solution of the inert ingredient or by granulating a mixture of a finely divided solid carrier and the active ingredient. The carrier used can consist of or contain a fertilizer or fertilizer mixture, as for example, a superphosphate.

The compositions of this invention can also be formulated as solutions of the active ingredient in an organic solvent or mixture of solvents, such as for example, alcohols; ketones, especially acetone; ethers, hydrocarbons; etc.

Where the toxicant itself is a liquid these materials can be sprayed on crops or insects without further dilution.

Petroleum hydrocarbon fractions used as solvents should preferably have a flash point above 73° F., an example of this being a refined aromatic extract of kerosene. Auxiliary solvents such as alcohols, ketones, and polyalkylene glycol ethers and esters can be used in conjunction with these petroleum solvents.

Compositions of the present invention can also be formulated as emulsifiable concentrates which are concentrated solutions or dispersion of the active ingredient in an organic liquid, preferably a water-insoluble organic liquid, containing an added emulsifying agent. These concentrates can also contain a proportion of water, for example, up to about 50% by volume, based on the total composition, to facilitate subsequent dilution with water. Suitable organic liquids include, e.g., the above petroleum hydrocarbon fractions previously described. Higher concentrations may be prepared using polar cosolvents such as cyclohexanone or dimethylformamide.

The emulsifying agent can be of the type producing water-in-oil type emulsions which are suitable for application by low volume spraying or an emulsifier of the type producing oil-in-water emulsions can be used, producing concentrates which can be diluted with relatively large volumes of water for application by high volume spraying or relatively small volumes of water for low volume spraying. In such emulsions, the active ingredient is preferably in a nonaqueous phase.

The present invention is further illustrated in greater detail by the following examples, but it is to be understood that the present invention in its broadest aspects, is not necessarily limited in terms of the reactants, or specific temperatures, residence times, separation techniques and other process conditions, etc.; or dosage level, exposure times, test species used, etc. by which the compounds and/or compositions described and claimed are prepared and/or used.

EXAMPLE 1

Preparation of N(2-chloroacetyl)-3-amino-2-oxazolidone

In three equal portions a solution of chloroacetic anhydride (99 g., 0.58 mol) in 300 ml. benzene was added to a suspension of 3-amino-2-oxazolidone, (59.2 g., 0.58 mol) in 100 ml. benzene. After each addition, the temperature rose to 36°. Upon stirring overnight, a clear, yellow solution formed to which was added 250 ml. satd. $NaHCO_3$ solution. After separation of the layers, the benzene layer was further washed with 150 ml. water. The water layers were combined and continuously extracted for 24 hours with ethylacetate. The ethyl acetate was cooled to yield 83 g. (80%) of the product as a white opalescent solid which was recrystallized from ethyl acetate to yield a product with an M.P. 94–96°. Structure was confirmed by NMR and IR.

*Analysis.*—Calcd. for ($C_5H_7ClN_2O_3$) (percent): C, 33.6; H, 3.9; N, 15.7; Cl, 19.9. Found (percent): C, 33.9; H, 4.0; N, 15.5; Cl, 19.4.

EXAMPLE 2

Preparation of O,O-dimethyl-S[N-3-(oxazolid-2-onyl)] carbamoyl methyl phosphorodithioate (Cpd. 3)

N(2-chloroacetyl)-3-amino - 2 - oxazolidone (11.3 g., 0.063 mol) and dimethyl phosphorodithioic acid potassium salt (10.9 g., 0.064 mol) were combined in 100 ml. acetonitrile and allowed to stir at room temperature overnight. The mixture was warmed to 40° C. for 2 hours, cooled and filtered. The solvent was removed in vacuo to yield clear, pale yellow oil, which was vigorously shaken with 50 ml. water to yield a white, solid which was recrystallized from ethanol, M.P. 105–107° C.

*Analysis.*—Calcd. for $C_7H_{13}N_2O_5PS_2$) (percent): C, 28.0; H, 4.3; N, 9.3; P, 10.3. Found (percent): C, 28.1; H, 4.7; N, 9.2; P, 9.8.

EXAMPLE 3

Preparation of O,O-dimethyl-S[N-3-(oxazolid-2-onyl)] carbamoyl methyl phosphorothioate (Cpd. 5)

N(2-chloroacetyl)-3-amino-2-oxazolidone (59 g., 0.33 mol) and dimethyl phosphorothioic acid ammonium salt (53.5 g., 0.33 mol) were combined in 350 ml. acetonitrile and the clear solution allowed to stir overnight. The resulting mixture was heated at 40° for 2 hours and at 50° for 3 hours. The acetonitrile solution was decanted from the gummy solids and the acetonitrile evaporated in vacuo and the resulting oil partitioned between ether and water. The ether layer was discarded and the water layer extracted with benzene (also discarded) and with chloroform. The chloroform layers were dried ($MgSO_4$) and evaporated in vacuo to give a viscous oil which was kept under high vacuum overnight to give 36.7 g. (38%) of Compound 5 as a white, waxy solid (purity 90–95%). Recrystallization of a small sample gave a white crystalline solid: M.P. 76–79°. The structure was confirmed by NMR and IR.

*Analysis.*—Calcd. for ($C_7H_{13}N_2O_6PS$) (percent): C, 29.6; H, 4.6; N, 9.8; P, 10.9. Found (percent): C, 30.0; H, 4.7; N, 10.0; P, 10.3.

EXAMPLE 4

Preparation of O,O-dimethyl-S-[N-3(5-methyl)oxazolid-2-onyl] carbamoyl methyl phosphorothioate (Cpd.) 1

N(2-chloroacetyl)-5-methyl-3-amino - 2 - oxazolidone was reacted with dimethyl phosphorothioic acid ammonium salt according to the method set forth in Example 3 to give an oil which was identified as O,O-dimethyl-S-[N-3(5 - methyl)oxazolid - 2 - onyl] carbamoyl methyl phosphorothioate. This structure was confirmed by NMR.

EXAMPLE 5

Preparation of O,O-dimethyl-S-[N-3(5-methoxy-methyl) oxazolid-2-onyl] carbamoyl methyl phosphorothioate (Cpd. 2)

N(2-chloroacetyl)-5 - methoxymethyl - 3 - amino - 2-oxazolidone was reacted with dimethyl phosphorothioic acid ammonium salt according to the method set forth in Example 3 to give an oil which was identified as O,O-dimethyl-[N - 3(5 - methoxymethyl)oxazolid - 2 -onyl] carbamoyl methyl phosphorothioate. This structure was confirmed by NMR.

EXAMPLE 6

Preparation of O,O-dimethyl-S-[N-3(5-ethylthiomethyl) oxazolid-2-onyl] carbamoyl methyl phosphorothioate (Cpd. 4)

N(2-chloroacetyl)-5 - ethylthiomethyl - 3 - amino - 2-oxazolidone was reacted with dimethyl phosphorothioic acid ammonium salt according to the method set forth in Example 3 to give an oil which was identified as O,O-dimethyl-S-[N-3(5-ethylthiomethyl)oxazolid-2 - onyl] carbamoyl methyl phosphorothioate. This structure was confirmed by NMR.

EXAMPLE 7

Preparation of O-ethyl-S-n-propyl-S - [N-3- oxazolid-2-onyl)] carbamoyl methyl phosphorodithioate (Cpd. 6)

N(2-chloroacetyl)-3 - amino - 2 - oxazolidone was reacted with O-ethyl-S-n-propyl phosphorodithioic acid potassium salt according to the method set forth in Example 3 to give an oil identified as O-ethyl-S-n-propyl-S-

[N-3-oxazolid-2-onyl)] carbamoyl methyl phosphorodithioate. This structure was confirmed by NMR.

EXAMPLE 8

Preparation of O,O-diethyl-S-[N-3(oxazolid-2-onyl)] carbamoyl methyl phosphorothioate (Cpd. 7)

N(2-chloroacetyl)-3-amino-2-oxazolidone was reacted with diethyl phosphorothioic acid ammonium salt according to the method set forth in Example 3 to give an oil identified as O,O-diethyl-S-[N-3(3-oxazolid-2-onyl)] carbamoyl methyl phosphorothioate. This structure was confirmed by NMR.

EXAMPLE 9

In this example the compounds of the subject invention were applied to insects in the greenhouse in the laboratory to determine their biological activity. The experimental compounds were tested as aqueous emulsions. These emulsions were prepared by dissolving the compound in acetone and dispersing it in distilled water with Triton X-100, an alkaryl polyether alcohol derived by the reaction of 1-octylphenol with ethylene oxide with spray emulsions containing desired concentration of the compound. These emulsions were then used in standard laboratory tests described below.

Mexican bean beetle: Leaves were dipped in the emulsion of the test chemical and allowed to dry. The individually treated leaves were placed in Petri dishes and five Mexican bean beetle larvae introduced into each of the two replicate dishes.

Mites contact: Potted bean plants infested with two spotted spider mites were placed on a turntable and sprayed with a formulation of the test chemical. The plants were held for seven days and the degree of mite control was rated after this period.

Mites systemic: Bean plants were treated by applying 20 ml. of the formulated test chemical to the soil. The mites were transferred to the plants after 24 hours. They were held for seven more days and the degree of mite control rated.

Aphid contact: Potted nasturtium plants infested with the bean aphids were placed on a turntable and sprayed with a formulation of the test chemical. The plants were held for two days and the degree of aphid control was rated.

Aphid systemic: Nasturtium plants were treated by applying 20 ml. of the formulated test chemical to the soil. The mites were transferred to the plant after 24 hours. The plants were held for 48 additional hours and the degree of the aphid control rated.

Housefly: Caged houseflies were sprayed with formulated test chemical. After two days the degree of housefly control was rated.

The results of these tests are tabulated in and set forth in Table I described hereinbelow.

What is claimed is:
1. A compound of the formula

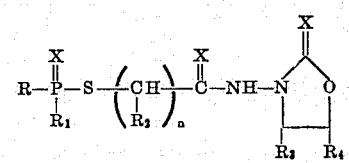

wherein each of R and $R_1$ is $C_1$–$C_3$ alkyl, $C_1$–$C_3$ alkoxy or $C_1$–$C_3$ alkylthio; $R_2$ is hydrogen or methyl each of $R_3$ and $R_4$ is hydrogen, $C_1$–$C_3$ alkyl, $C_2$ and $C_3$ alkoxyalkyl or $C_2$ or $C_3$ alkylthioalkyl; each X is oxygen or sulfur; and $n$ is the integer 1 or 2.

2. A compound of the formula

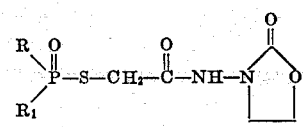

wherein each of R and $R_1$ is $C_1$–$C_3$ alkoxy.

3. A compound according to claim 1 which is O,O-dimethyl-S-[N-3(5-methyl)oxazolid - 2 - onyl] carbamoyl methyl phosphorothioate.

4. A compound according to claim 1 which is O,O-dimethyl-S-[N-3(5 - methoxymethyl)oxazolid - 2 - onyl] carbamoyl methyl phosphorothioate.

5. A compound according to claim 2 which is O,O-dimethyl - S-[N-3(oxazolid - 2 - onyl)]carbamoyl methyl phosphorodithioate.

6. A compound according to claim 1 which is O,O-dimethyl-S-[N-3(oxazolid - 2 - onyl)] carbamoyl methyl phosphorothioate.

7. A compound according to claim 2 which is O,O-dimethyl-S-[N-3(5-ethylthiomethyl)(oxazolid-2-onyl)].

8. A compound according to claim 1 which is O-ethyl-S-n-propyl-S-[N-3(oxazolid - 2 - onyl] carbamoyl methyl phosphorodithioate.

9. A compound according to claim 2 which is O,O-diethyl-S-[N-3(oxazolid-2-onyl)] carbamoyl methyl phosphorothioate.

10. A compound according to claim 1 which is ethyl-O-ethyl - S - [N - 3(5-methyl)oxazolid-2-onyl] carbamoyl methyl phosphorothioate.

11. A compound according to claim 1 which is O,O-diethyl-S-[N - 3(4-methyl)oxazolid - 2 - onyl] carbamoyl methylthiomethyl phosphorodithioate.

TABLE I.—INSECTICIDAL DATA

| Compound | P.p.m. | Mexican bean beetle | Mite contact | | Mite systemic | | Aphid | | Housefly |
|---|---|---|---|---|---|---|---|---|---|
| | | | Adult | Nymph | Adult | Nymph | Contact | Systemic | |
| O,O-dimethyl-S-[N-3(5-methyl) oxazolid-2-onyl) carbamoyl methyl phosphorothioate (Cpd. 1) | 250 | 100 | 0 | 0 | 100 | 90 | 100 | 100 | -------- |
| O,O-dimethyl-S-[N-3(5-methoxymethyl) oxazolid-2-onyl] carbamoyl methyl phosphorothioate (Cpd. 2) | 250 | 0 | 100 | 100 | 100 | 100 | 80 | 30 | 0 |
| O,O-dimethyl-S-[N-3(oxazolid-2-onyl)] carbamoyl methyl phosphorodithioate (Cpd. 3) | 250 | 0 | 100 | 100 | 100 | 100 | 10 | 80 | 0 |
| O,O-dimethyl-S-[N-3(5-ethylthio methyl) oxazolid-2-onyl) carbamoyl methyl] phosphorothioate (Cpd. 4) | 250 | 70 | 100 | 100 | 100 | 100 | 40 | 100 | -------- |
| O,O-dimethyl-S-[N-3(oxazolid-2-onyl)] carbamoyl methyl phosphorothioate (Cpd.5) | 250 | 100 | 100 | 100 | 100 | 100 | 100 | 100 | 90 |
| O-ethyl-S-n-propyl-S-[N-3 (oxazolid-2-onyl)] carbamoyl methyl phosphorodithioate (Cpd. 6) | 250 | 0 | 100 | 100 | 100 | 100 | 60 | 50 | 50 |
| O,O-diethyl-S-[N-3(oxazolid-2-onyl)] carbamoyl methyl phosphorothioate (Cpd. 7) | 250 | 100 | 100 | 100 | 90 | 90 | 100 | 100 | 80 |

12. A compound according to claim 1 which is O,O-diethyl-S-[N-3(5-ethyl)oxazolid - 2 - onyl] thiocarbamoyl methyl phosphorothioate.

References Cited

UNITED STATES PATENTS 3,232,951  2/1966  Lorenz _____ 260—304

ALEX MAZEL, Primary Examiner

R. V. RUSH, Assistant Examiner

U.S. Cl. X.R.

424—200